United States Patent [19]

Reynolds, Jr.

[11] 4,358,633

[45] Nov. 9, 1982

[54] ELECTRICAL BUS BAR ASSEMBLY AND METHOD OF MANUFACTURE

[76] Inventor: James W. Reynolds, Jr., 35 Delaware Ave., Commack, N.Y. 11725

[21] Appl. No.: 105,905

[22] Filed: Dec. 21, 1979

[51] Int. Cl.$^3$ .......................... H02G 5/06; B29C 1/00
[52] U.S. Cl. .................................. 174/72 B; 249/97; 264/272.15
[58] Field of Search .................... 174/72 B, 52 PE; 249/95–97; 264/272.15, 275, 277

[56] References Cited

U.S. PATENT DOCUMENTS

| | | | |
|---|---|---|---|
| 3,662,088 | 5/1972 | Wright et al. ..................... | 174/72 B |
| 3,818,119 | 6/1974 | Sutherland et al. ............... | 174/72 B |
| 3,893,233 | 7/1975 | Glover .............................. | 174/72 B |
| 3,937,976 | 2/1976 | McGuirk ..................... | 174/52 PE X |
| 3,944,182 | 3/1976 | Yanagita et al. ................. | 249/96 X |

OTHER PUBLICATIONS

Rieley *Laminated Bus System* IBM Technical Disclosure Bulletin; vol. 12, No. 8, pp. 1268–1269; Jan. 1970.

*Primary Examiner*—A. T. Grimley
*Assistant Examiner*—D. A. Tone
*Attorney, Agent, or Firm*—Darby & Darby

[57] ABSTRACT

A bus bar assembly is constructed by arranging a plurality of flat, elongated conductors in stacked alignment, with insulating washers, or the like, acting as spacers therebetween. An insulative, hardenable encapsulant is then poured over the conductors and, not only encapsulates them, but also fills the spacers between them. In a preferred embodiment, each conductor includes a plurality of upwardly extending posts of the type conventionally used for wire wrapping. Each conductor also includes an over-sized opening for each post of every other conductor. The bus bar assembly is manufactured with the aid of a two-part mold having a vertical interface or separation along its length. The mold includes an open topped compartment in which the bus bar assembly is formed. The compartment has a bottom wall with a plurality of aligned, threaded bores extending downwardly, which bores are divided by the vertical separation of the mold. The conductors are assembled inside the mold compartment by consecutively stacking them with insulating washers therebetween. An insulating screw is then passed through aligned bores in the conductors and is threaded into a corresponding bore in the mold bottom wall, thereby securing the conductors in stacked arrangement within the mold. The liquid encapsulant is then poured into the mold compartment and encapsulates the conductors, as well as filling the spaces therebetween and all holes therein. After the encapsulant material has hardened, the mold is separated along its separation, so that the finished bus bar assembly can be removed.

11 Claims, 5 Drawing Figures

U.S. Patent   Nov. 9, 1982   Sheet 2 of 2   4,358,633
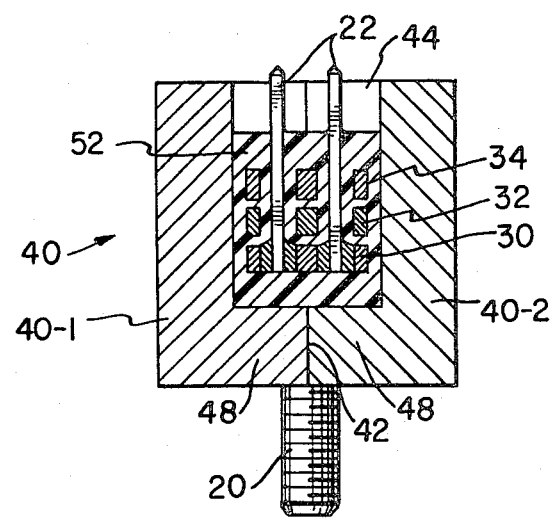
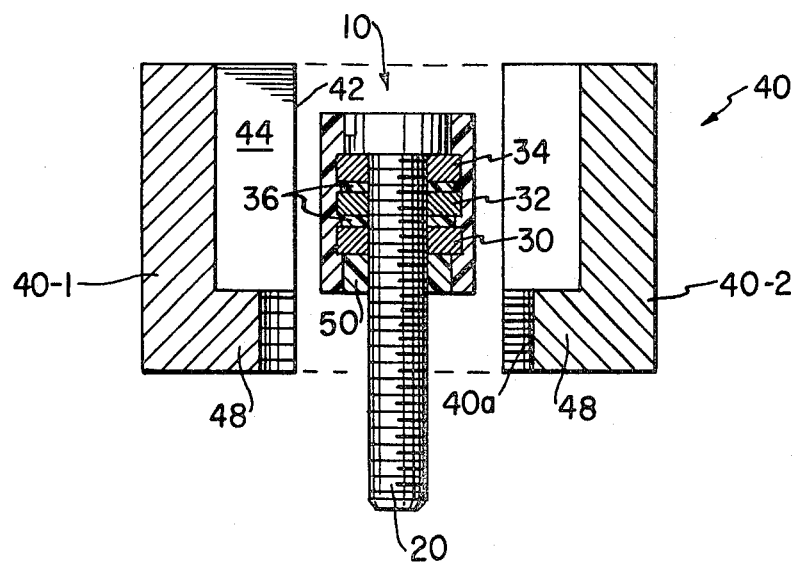

ELECTRICAL BUS BAR ASSEMBLY AND METHOD OF MANUFACTURE

The present invention relates generally to bus bar assemblies for electrical distribution and, more particularly, concerns an improved bus assembly and a method and apparatus for manufacturing the same.

Bus bar assemblies are widely used in electronic systems for power distribution. Typically, such bus bar assemblies have been constructed by arranging flat, elongated conductors in a stacked relationship with insulating material between them and joining the entire arrangement with bolts, or the like, extending therethrough. Also, protruding connector pins have been provided on the various conductors for making electrical connections thereto. This has required the insulators to be punched or drilled with many precisely located holes for the connector pins in order to avoid the possibility that the pins may produce a short circuit between two conductors. In addition, it has often been necessary to house the entire bus bar within a rigid duct, or the like, in order to obtain structural strength. All of these features of conventional bus bar assemblies have made them unnecessarily expensive and complex. A typical prior art bus bar assembly is disclosed in U.S. Pat. No. 3,187,086, granted to E. W. Moodie, et al on June 1, 1965.

Broadly, it is an object of the present invention to avoid one or more of the shortcomings of existing bus bar assemblies. It is specifically contemplated that the present invention provide an efficient and economical process for manufacturing a bus bar assembly which overcomes these shortcomings.

It is another object of the present invention to provide a bus bar assembly which eliminates the need to provide many precisely located holes in insulators.

It is a further object of the present invention to eliminate the need for a duct or other separate structural reinforcing means for a bus bar assembly.

It is yet another object of the present invention to provide a bus bar assembly which is convenient and reliable in use, but relatively simple and inexpensive in construction.

It is also an object of the present invention to manufacture a bus bar assembly by a method which is reliable and convenient, yet relatively simple and inexpensive and, at the same time, amenable to mass production techniques.

In accordance with the present invention, a bus bar assembly is constructed by arranging a plurality of flat, elongated conductors in stacked alignment, with insulating washers, or the like, acting as spacers therebetween. An insulative, hardenable encapsulant is then poured over the conductors and, not only encapsulates them, but also fills the spaces between them. In a preferred embodiment, each conductor is provided with an upwardly extending main terminal by means of which power is connected thereto. In addition, each conductor includes a plurality of uwpardly extending posts of the type conventionally used for wire wrapping. Each conductor also includes an over-sized opening for each post of every conductor disposed therebelow. When the encapsulant is poured over the conductors, it encapsulates them, fills the spaces between them and fills the over-sized holes in each conductor. When the encapsulant hardens, a structurally strong assembly, which is impervious to air and water, is formed, in which insulative material is provided between the conductors and around each pin for each conductor. Inasmuch as the holes for the posts are filled with the encapsulant, they can be made substantially over-sized and, therefore, need not be precisely located.

The method of the present invention is performed with the aid of a two part mold having a vertical split along its length. In the preferred embodiment, the mold includes an open topped compartment in which the bus bar assembly is formed. The compartment has a bottom wall with a plurality of aligned, threaded bores extending downwardly therethrough in the vicinity of the vertical split of the mold. The conductors are assembled inside the mold compartment by consecutively stacking them with insulating washers therebetween. Each conductor has a through bore in alignment with each bore of the bottom wall of the mold and the insulating washers are positioned over these bores. When all of the conductors have been stacked in this manner, an insulating screw is passed through each set of aligned bores in the conductors and is threaded into the corresponding bore in the mold bottom wall, thereby securing the conductors in stacked arrangement within the mold. The liquid encapsulant is then poured into the mold compartment and is permitted to encapsulate the conductors, as well as to fill the spaces therebetween and all holes therein. After the encapsulant has hardened, the mold is separated along its split, so that the finished bus bar assembly can be removed.

The foregoing brief description, as well as further objects, features and advantages of the present invention will be understood more completely from the following detailed description of presently preferred, but nonetheless illustrative, embodiments in accordance with the present invention, with reference being had to the accompanying drawing wherein:

FIG. 4 is a sectional view as in FIG. 3 taken substantially along line 4—4 in FIG. 2, the bus bar assembly being shown within the mold immediately after the encapsulant has been poured thereinto; and FIG. 5 is a sectional view as in FIG. 4 showing the bus bar assembly after the encapsulant has hardened with the mold separated along its vertical split.

Figure 1:
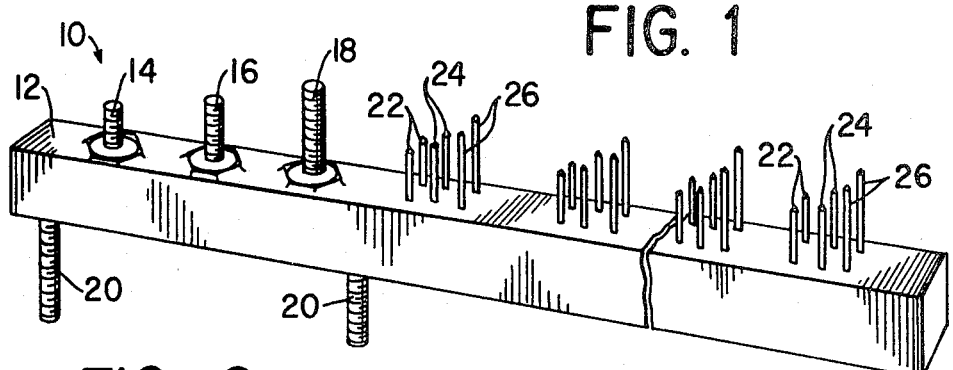
FIG. 1 is a perspective view of a bus bar embodying objects and features of the present invention.

Referring now to FIG. 1, there is shown a bus bar assembly 10 embodying objects and features of the present invention. The bus bar assembly 10 includes an encapsulated main body 12 from which three different main terminals 14, 16, and 18 extend upwardly and a plurality of insulative, threaded shafts 20 extend downwardly. Each of the main terminals 14, 16 and 18 comprises a conductive threaded shaft and has a power supply connected thereto, for example by wrapping a conductor thereabout and threading a nut on the shaft to secure the conductor. The terminals 14, 16, and 18 are shown as being of unequal heights so as to be easily distinguishable. In addition, the terminals 14, 16 and 18 are electrically connected to upwardly projecting pins 22, 24 and 26, respectively. Like the corresponding main terminal 14, 16 and 18, the respective pins 22, 24 and 26 are of different heights.

In use, the bus assembly 10 could be secured to a frame or electrical chassis by passing the shaft 20 through predrilled holes and threading nuts thereover. Electrical conductors from different power supplies could then be secured to terminals 14, 16, and 18 by means of nuts threaded over the respective shafts. Power from the respective power supplies could then be distributed to different electrical circuits by wrapping wires from these circuits over the respective pins 22, 24 and 26, in a well-known manner.

Figure 2:
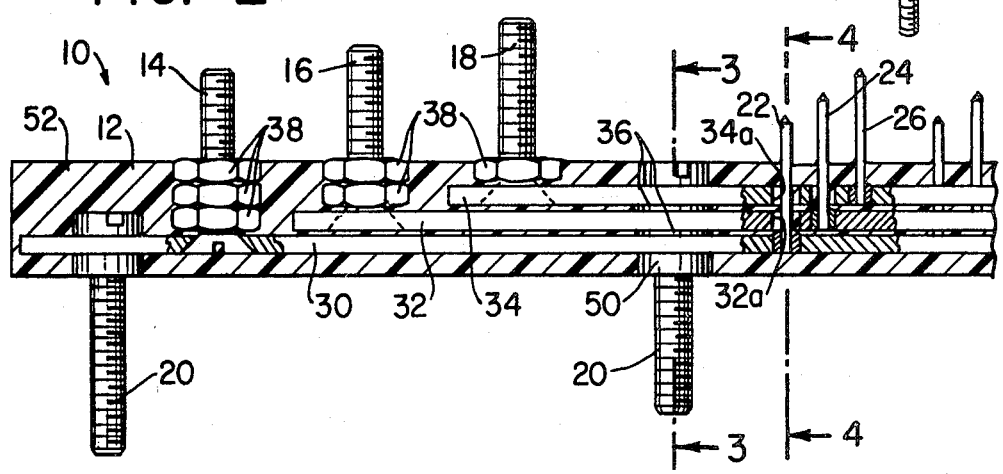
FIG. 2 is a fragmentary, front sectional view of the bus bar assembly of FIG. 1 taken on an enlarged scale.

As best seen in FIG. 2, inside the encapsulant 52 the main body 12 includes three flat, elongated conductors 30, 32 and 34, spaced in a stacked arrangement with insulating washers 36 therebetween. Each of the main terminals 14, 16 and 18 comprises a conductive, flat head screw which is passed through a countersunk hole in a respective one of the conductors 30, 32 and 34 and is secured thereto by means of one or more nuts 38. In addition, each of the conductors 30, 32 and 34 has a respective set of the pins 22, 24 and 26 extending upwardly therefrom to a predetermined height different from each other set, and the conductors 32 and 34 have oversized holes 32a and 34a through which the pins from lower conductors extend. The oversized holes 32a and 34a are aligned to permit passage of the pins 22 therethrough. The threaded shafts 20 are actually the bodies of insulative screws which pass through aligned holes in the conductors 30, 32 and 34.

In the preferred embodiment, the height of the terminals 14, 16 and 18 and the height of the respective pins are coordinated for easy recognition. That is, the shortest terminal, 14, corresponds to the shortest pins, 22, etc.

The method of the invention is performed with the aid of a mold 40 comprising the two symmetrical parts 40-1 and 40-2 which are joined at the vertical split or interface 42 extending along the length of the mold 40. The mold includes a compartment 44 having an open top 46 and a bottom wall 48. A plurality of bores 40a extend downwardly through the bottom wall 48 and are spaced in alignment along the split 42.

Figure 3:
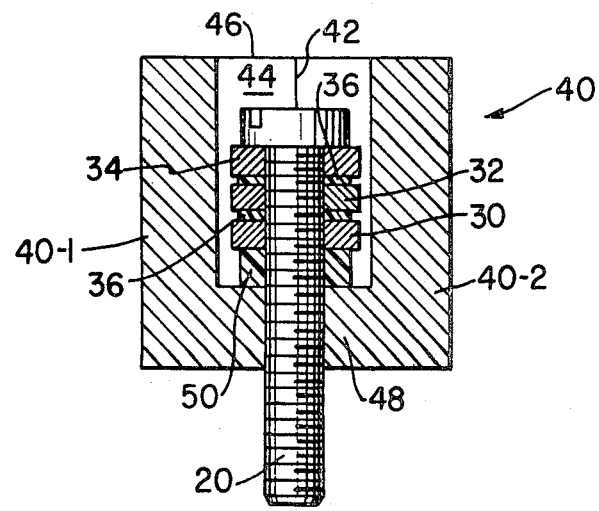
FIG. 3 is a sectional view, on an enlarged scale, taken substantially along line 3—3 of FIG. 2 and showing the components of the bus bar assembly secured within the mold immediately prior to the pouring of the encapsulant thereinto.

In practice, the bus bar 10 is assembled inside the mold 40. Initially, each of the individual conductors 30, 32 and 34 with its corresponding upwardly extending screw (14, 16 and 18) and its upwardly extending pins (22, 24 or 26) is first assembled. Next, an insulating washer 50 is positioned in alignment with each of the bores 40a in the bottom wall 48. Then, the conductor 30 is positioned over the washers 50 so that predrilled holes in the conductor are in alignment with the holes 40a in the bottom wall of compartment 44. The washers 36 are then placed in position and the conductor 32 is positioned over the conductor 30, followed by a second layer of washers 36 and the conductor 34. With the conductors in this stacked arrangement, the screws 20 are passed through the predrilled holes in the conductors and are screwed into the bores 40a. With this done, the assembly appears as in FIG. 3.

With the conductor secured within the mold 40, as explained above, a hardenable encapsulant 52, preferably an epoxy resin, is poured into the compartment 44. This encapsulant not only encompasses the conductors, but also fills the spaces between them, as well as the oversized holes 32a and 34a. After the encapsulant hardens, the two parts 40-1 and 40-2 of the mold 40 may be separated to permit removal of the finished bus bar assembly 10.

When the encapsulant is an epoxy resin, the mold 40 is preferably made of teflon coated steel so that the encapsulant will not adhere to the walls of the compartment 44.

From the foregoing description, it will be appreciated that the holes 32a and 34a need not be precisely aligned and may, in fact, be made substantially oversized, since they are ultimately filled with encapsulant. This not only lends a rigid support to the pins 22 and 24, but also eliminates any possibility of these pins being short-circuited accidentally to one of the conductors. It will also be appreciated that since the encapsulant surrounds the conductors and fills all voids, a substantially rigid and structurally strong bus bar assembly is formed which is impervious to air, water and corrosive substances.

Although preferred forms of the invention have been disclosed for illustrative purposes, it will be appreciated by those skilled in the art that many additions, modifications, and substitutions are possible without departing from the scope and spirit of the invention as defined by the accompanying claims. For example, the bus bar assembly need not be limited to three conductors, but could be provided with any number appropriate to the application.

What is claimed is:

1. An electrical bus bar assembly comprising:
   a plurality of elongated conductors in spaced, stacked alignment;
   at least one conductive connector pin protruding from each conductor and extending outwardly from said bus bar assembly;
   a plurality of terminal means each dedicated to at least one of said conductors for providing an electrical input connection to the respective conductor;
   each conductor having an over-sized bore therethrough positioned in alignment with each pin protruding from every other conductor, so that said pin may pass through said each conductor with substantial clearance; and
   a non-conductive hardened material encapsulating said conductors and extending therebetween as well as into said over-sized bores to provide insulation between said conductors and between said conductors and said pins.

2. A bus bar assembly in accordance with claim 1, further comprising at least one non-conductive shaft protruding from said bus bar assembly and adapted to be mounted to a receiving surface.

3. A method for manufacturing an electrical bus bar assembly performed with the aid of a multi-part mold having at least one separation between its parts extending along its length, said mold having an interior compartment with a main wall divided by said separation, said method being further performed with the aid of engagement means adapted to be secured to said main wall, said method comprising the steps of:
   stacking conductors in spaced alignment by inserting insulating spacers therebetween;
   securing said engagement means to said main wall and operating said engagement means to engage said conductors so that they are retained in a fixed relationship with respect to said main wall; and
   pouring a hardenable encapsulant over said retained conductors so that said encapsulant fills the spaces between said conductors and also encapsulates them.

4. The method of claim 3 performed with the aid of a mold having a plurality of threaded bores in said bottom wall, said engagement means being a plurality of fasteners having an externally threaded body dimensioned to be received in said threaded bores, said securing step comprising passing said fasterners through holes provided in said conductors and screwing them into said threaded bores.

5. The method of claim 3 performed with the aid of a mold having a plurality of bores in said bottom wall, said engagement means being a plurality of fasteners having a body dimensioned to be received in said bores, said securing step comprising passing said fasteners through holes provided in said conductors and retaining them against removal in said bores.

6. A bus bar assembly manufactured by the method comprising the steps of:
   stacking conductors in spaced alignment by inserting insulating spacers therebetween;
   securing engagement means to a main wall of a mold and operating said engagement means to engage said conductors so that they are retained in a fixed relationship with respect to said main wall; and
   pouring a hardenable encapsulant over said retained conductors so that said encapsulant fills the spaces between said conductors and also encapsulates them.

7. A bus bar assembly as in claim 6, said method being performed with the aid of a mold having a plurality of threaded bores in said bottom wall, said engagement means being a plurality of fasteners having an externally threaded body dimensioned to be received in said threaded bores, said securing step comprising passing said fasteners through holes provided in said conductors and screwing them into said threaded bores.

8. A bus bar assembly as in claim 7 wherein said method is performed with the aid of a mold having a plurality of bores in said bottom wall, said engagement means being a plurality of fasteners having a body dimensioned to be received in said bores, said securing step comprising passing said fasteners through holes provided in said conductors and retaining them against removal in said bores.

9. Apparatus for manufacturing a bus bar assembly including a plurality of elongated conductors stacked in spaced alignment, comprising:
   a multi-part mold having at least one separation between its parts extending along its length, said mold having an interior compartment extending along its length including a main wall divided by said separation; and
   means positioned and dimensioned to extend through a conductor and detachably secured to said main wall for retaining said conductors in a fixed relationship with respect to said main wall.

10. Apparatus for manufacturing a bus bar assembly including a plurality of elongated conductors stacked in spaced alignment, comprising:
    a multi-part mold having at least one separation between its parts extending along its length, said mold having an interior compartment extending along its length including a main wall divided by said separation;
    means positioned and dimensioned to extend through at least one conductor detachably secured to said main wall for retaining said conductors in a fixed relationship with respect to said main wall; and
    said main wall having a plurality of spaced, internally threaded bores divided by said separation, said retaining means comprising a plurality of fasteners with an externally threaded body dimensioned to be received in said threaded bores, said fasteners being adapted to pass freely through bores in said conductors and to be screwed into threaded bores.

11. Apparatus for manufacturing a bus bar assembly including a plurality of elongated conductors stacked in spaced alignment, comprising:
    a multi-part mold having at least one separation between its parts extending along its length, said mold having an interior compartment extending along its length including a main wall divided by said separation,
    means positioned and dimensioned to extend through at least one conductor and detachably secured to said main wall for retaining said conductors in a fixed relationship with respect to said main wall; and
    said main wall having a plurality of spaced bores divided by said separation, said retaining means comprising a plurality of fasteners with a body dimensioned to be received in said bores, said fasteners being adapted to pass freely through holes in said conductors and to be retained in said bores against removal therefrom.

* * * * *